July 31, 1962 S. BOUSKY 3,047,870
OSCILLOGRAPHIC VIEWING AND RECORDING SYSTEMS
Filed Sept. 13, 1955 2 Sheets-Sheet 1
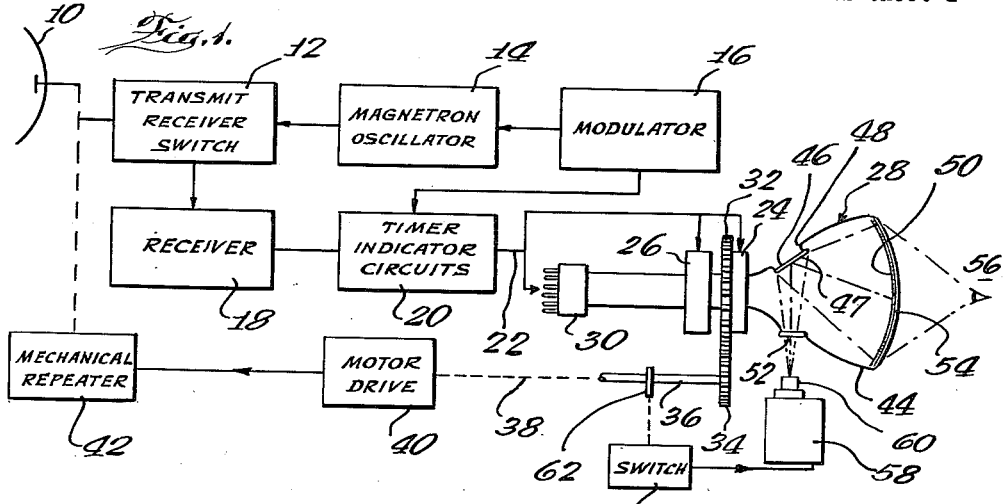
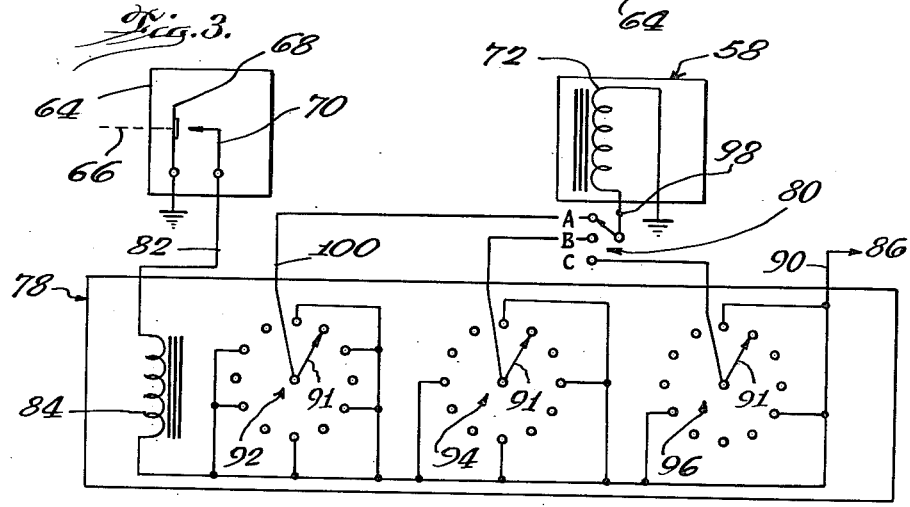
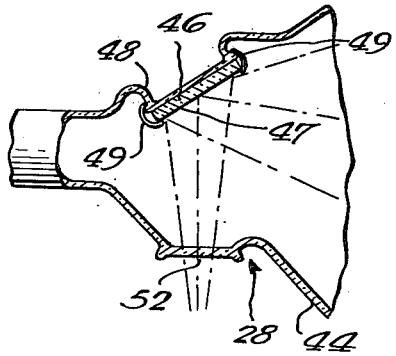
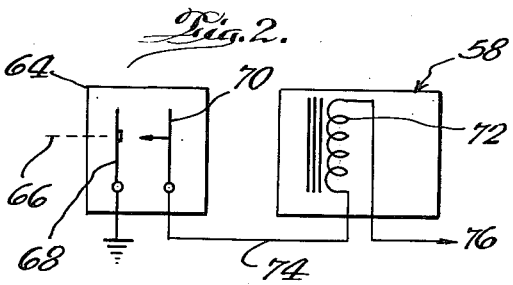
INVENTOR.
Samuel Bousky
BY Louis Bernat
Attorney July 31, 1962 S. BOUSKY 3,047,870
OSCILLOGRAPHIC VIEWING AND RECORDING SYSTEMS
Filed Sept. 13, 1955 2 Sheets-Sheet 2
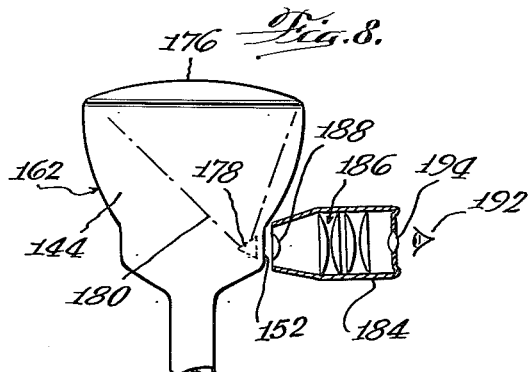
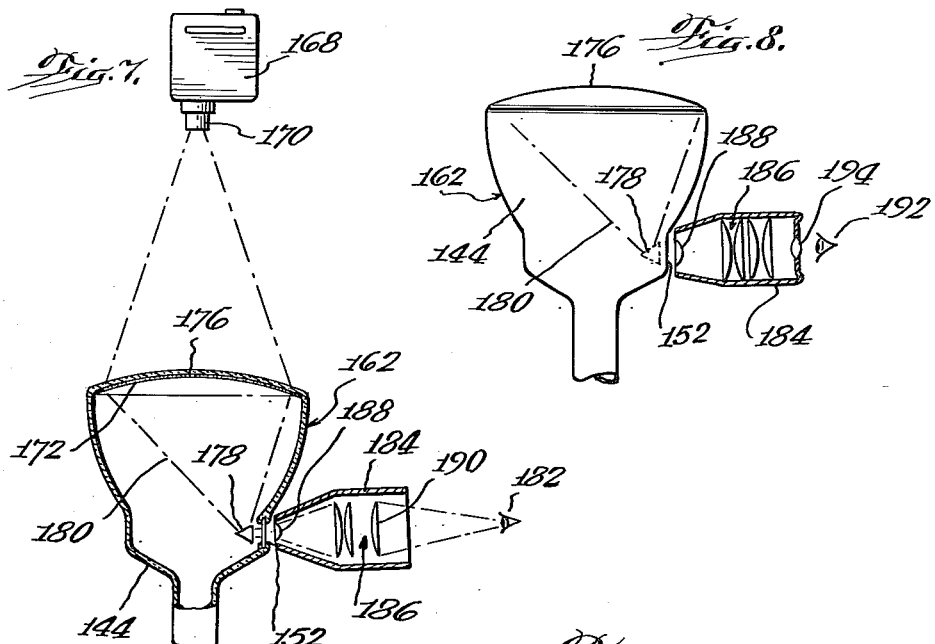
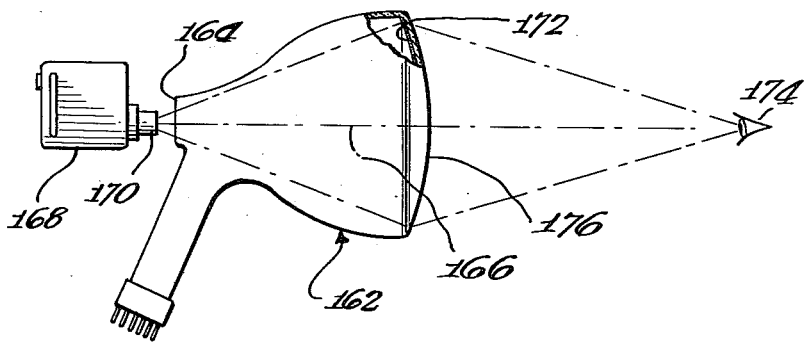
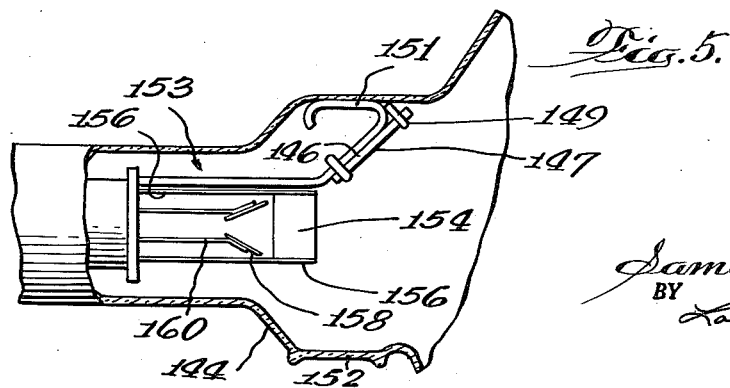
INVENTOR.
Samuel Bousky
BY Louis Bernat
Attorney United States Patent Office 3,047,870
Patented July 31, 1962

3,047,870
OSCILLOGRAPHIC VIEWING AND RECORDING SYSTEMS
Samuel Bousky, River Grove, Ill., assignor, by mesne assignments, to Chicago Aerial Industries, Inc., Melrose Park, Ill., a corporation of Delaware
Filed Sept. 13, 1955, Ser. No. 533,943
2 Claims. (Cl. 346—110)

This invention relates to oscillographic viewing and recording systems, and particularly to such systems in which simultaneous viewing and photographic recording of cathode ray oscillographic images is performed.

Present methods for recording such oscillographic images involve the use of a camera arranged to view the front or outer surface of the cathode ray tube and thus to form an image on the film within the camera. This method requires the use of opaque enclosures for the oscillographic tube, camera, and space therebetween so as to permit photography of the tube face without interference from stray or ambient light. Consequently, an observer's ability to directly view the oscillographic tube image and simultaneously photograph the image is greatly impaired.

To circumvent this difficulty, methods have been devised which employ special optical surfaces interposed between the cathode ray tube face and the camera lens so as to transmit a portion of the light from the cathode ray tube face for photographic purposes and to reflect most of the remainder of the light for direct viewing purposes. Conversely, the viewing may be performed by transmission and the photography by reflection, or both transmission and photography may be accomplished by separate reflective means directed from the image on the face of the cathode ray tube.

Such methods entail an appreciable loss of light from the image through the partially transmissive and partially reflective surfaces impairing both photography and viewing. Such methods also involve a cumbersome and inconvenient arrangement of equipment to permit viewing and photography of the same surface. Application of such technique for airborne use in modern aircraft results in bulky equipment which is difficult to install and use.

The present invention overcomes these shortcomings by providing for an additional indirect method of photographing or viewing the oscilloscope image by utilizing the light emanating backward into the tube from the oscilloscope face.

Accordingly, it is an object of this invention to provide a new and improved system for photographically recording cathode ray oscillographic images while simultaneously permitting their visual observation.

Another object of this invention is to provide an improved oscillographic camera and viewing system which does not involve substantial losses in image light level through partially reflective or transmissive devices which impair photography or visual observation.

A further object of this invention is to provide an improved oscillographic camera system which permits the direct viewing of the cathode ray tube image.

A further object of this invention is to provide an improved oscillographic camera and viewing system which utilizes the light emission in both directions from the fluorescent face.

Other objects and advantages of this invention will be apparent during the course of the following description in connection with the accompanying drawings, wherein:

FIGURE 1 is a combination schematic block diagram and pictorial view, partly in section, of one embodiment of this device incorporated in a plan-position-indicator (PPI) radar;

FIGURE 2 is a circuit schematic showing the interconnection between the cycling switch and camera;

FIGURE 3 is a circuit schematic showing an alternate arrangement to that of FIGURE 2;

FIGURE 4 is a partial sectional view of an alternate oscilloscope tube in which the light deflecting surface is supported by the tube envelope;

FIGURE 5 is a partial sectional view of an alternate oscilloscope tube in which the light deflecting surface is supported by the electron gun structure;

FIGURE 6 is a partial sectional view of an alternate oscilloscope tube arrangement permitting direct on-axis rear photography;

FIGURE 7 is a partial sectional pictorial view of an alternate oscilloscope tube and viewing arrangement; and FIGURE 8 is a partial sectional pictorial view of an alternate arrangement for that of FIGURE 7.

Referring now more particularly to FIGURE 1, there is shown an oscillographic camera system for recording a PPI radar presentation utilizing magnetic deflection obtained by rotation of the deflecting coil. The basic elements of the radar system, such as the antenna 10, transmit-receive switch 12, magnetron oscillator 14, modulator 16, receiver 18, and timer-indicator circuits 20 are shown in schematic or block form without further description, since their functions and configurations are well known to those skilled in the art and are fully described in several published texts on radar equipment.

Output cable 22 provides connecting circuits to the deflection coil 24, focus coil 26, and cathode ray tube 28 at its base 30 in a manner well known in the art. Sweep rotation of the cathode ray beam is obtained in this arrangement by mechanical rotation of the deflecting coil 28 by means of integral gear 32 coupled with the drive gear herein indicated in 1 to 1 ratio, so that shaft 36 will rotate at the same rate as the PPI sweep. The broken line 38 indicates the mechanical coupling between shaft 36 and electric motor drive 40 which supplies the motive power to effect the sweep as described. Motor drive 16 is electrically connected to a mechanical repeater 42 which is in turn mechanically coupled to provide sweep rotation of the radar antenna 10. Couplings are so arranged that rotation of shaft 36 is in synchronism with rotation of antenna 10.

Cathode ray tube 28 is of conventional design as regarding the electron beam formation and image light production. The envelope 44 is of special design in that a reflective surface, such as mirror 46, is supported internally from a suitable dimple 48 so as to permit viewing of the interior surface of the fluorescent layer 50 through transmission window 52 which is fused into the tube envelope 44. An electron beam developed within the cathode ray tube 28, is impinged against the fluorescent layer 50 which generates visible light as is well known to those skilled in the art. A portion of the light so generated is transmitted through the tube face 54, and may be viewed without impairment by an individual at position 56. A larger portion of the light so generated is radiated and reflected into the interior at the tube envelope 44 and may thus be recorded by a synchronized camera 58 through the lens 60.

The slight distortion due to the off-axis location of the mirror 20, which causes the light deflected by the mirror from the upper edge of the fluorescent screen to travel a smaller distance than that deflected from the lower edge, may be readily corrected, if desired, within the camera by means of a compensating inclination of the film platten. Since the mirror 20 may be located well toward the neck of the tube, this off-axis error is relatively small thus permitting good correction while still allowing the use of a relatively large aperture lens for the camera.

Exposure by the camera 58 for one complete sweep is effected by means of cam 62 which is in turn electrically connected through a switch 64 to magnetically actuate a conventional shutter mechanism, not shown, within the camera 58. FIGURE 2 indicates this portion of the circuit schematically. The broken line 66 indicates an electrically insulated mechanical coupling to the initial spring contact leaf 68 of switch 64 to cam 62 which makes one revolution for one sweep cycle. Thus, one during each sweep cycle, initial contact leaf 68 will be deflected sufficiently to make electrical contact with the secondary leaf contact 70, establishing an electrical circuit 74 through the solenoid 72 positioned generally within the camera 58 by means of an interconnecting electrical connection to primary source of D.C. voltage 76 such as a 28 volt aircraft storage battery. Actuation of solenoid 72 operates a shutter mechanism, not shown, which is of the "time" operate type. This terminology is well known in the photographic art and describes a shutter wherein one mechanical actuation and release opens the shutter which then remains open by means of an internal interlock until the next mechanical actuation and release closes the shutter. Thus, two successive actuations of switch 64, which occurs at the beginning and end of a complete sweep cycle, effectuates a photographic exposure within a complete sweep cycle. The camera 58 may be arranged so as to be automatically recycled thereby utilizing a fresh film frame during the alternate sweep cycles when the shutter is closed, thus permitting automatic photography of every second sweep cycle.

An alternate arrangement is shown in FIGURE 3 wherein switch 64 and solenoid 72 are similar to the types as described in FIGURE 2, but with an additional solenoid actuated stepping switch 78 and manual three position switch 80 connected therebetween. The secondary leaf contact 70 of switch 64 is now connected through the lead wire 82 to actuating solenoid 84 which is in turn connected to a D.C. supply source 86 through the lead wire 90. Thus, each actuation and release of switch 64 indexes or advances the ganged selector arms 91 of switch banks 92, 94 and 96 by one position. Switch 64 is not to be considered as limited to the type shown, but may be any suitable momentary contact switch such as a microswitch or other equivalent.

The stepping switch 78 may be of a variety of rotary positions, banks, and circuits as required, but is here shown in one embodiment as a twelve position, three bank, three circuit stepping switch. When manual switch 80 is in the uppermost or A position, solenoid 72 is connected by the lead wire 98 through said switch 80 to the selector arm 91 of the switch bank 92 by the lead wire 100. Bank 92 is so wired that alternate contacts are open (unwired) and the others wired to the power source through the D.C. supply source lead wire 90. In this manner, each actuation and release of switch 64 will index or advance selector arm 91 of switch bank 92 by one position permitting said selector arm 91 to swell at each contact position for one PPI sweep cycle, and to actuate and maintain actuation of shutter solenoid 72 for one complete cycle of every second sweep cycle. The camera shutter in the arrangement of FIGURE 3 is of the "bulb" operate type. This terminology is well known in the photographic art and describes a shutter wherein a mechanical actuation opens the shutter which remains open during the interval of mechanical actuation and closes upon release.

It may now be seen that the arrangement of FIGURE 3 with the manual switch 80 in the A position duplicates the operation obtained with the arrangement of FIGURE 2 by somewhat different means. In addition, every third sweep or fourth sweep may be photographed by selectng positions B or C respectively of switch 80, since switch banks 94 and 96 are wired to provide one cycle dwell for each third and fourth cycle respectively. It is also evident that, with different numbers of switch positions on the switch banks and with different wiring connections, many different exposure sequences may be obtained.

This invention is not to be considered limited to cathode ray tube displays wherein the deflection is obtained magnetically by mechanical rotation of the deflection coil as in the embodiment shown, since many other sweep methods, both magnetically and electrostatically actuated, such as used in various radar or television displays, may be viewed and photographically recorded by the means herein described. Where deflection signals are obtained as sine and cosine components from a resolver, actuation of switch circuit 64 may be mechanically coupled to the rotation of the resolver shaft to establish cyclic periodicity. In PPI radar utilizing full azimuth sweep, actuation may be obtained directly or by repeater from the antenna drive. In sector sweep radar, initiation and release may be obtained separately with two switches actuated at the extremes of angular position of the antenna 10, rather than the various mechanical means already described. Electronic means may also be utilized to identify the beginning of the cycle interval, to establish cyclic periodicity, and to actuate the shutter solenoid 58, stepping switch 78, or relays. Such identification may be obtained from deflection voltages, keyed pulses, or synchronization pulses in radar or television displays. These, and many other variations, are possible to permit single sweep recording with simultaneous unimpaired viewing.

Referring now to FIGURE 4, there is shown a partial sectional view of a portion of a cathode ray tube 28 such as may be employed in the embodiment of FIGURE 1. FIGURE 4 indicates one means of incorporating an internal reflective surface 46 and the cooperating window. The reflective surface 46 may be a suitably flat glass disc of circular or elliptical shape upon one surface of which is deposited a thin specular metallic coating 47 constituting a front reflecting mirror. Said surface 46 is firmly supported against a suitably formed dimple 48 in the wall of the cathode ray tube envelope 44 by means of a thin metallic spring clip 49. The position and form of said dimple 48 fixes the angular orientation of mirror surface 46. On the diametrically opposite surface of tube envelope 44, a transparent window 52, which may be of circular shape, is fused into the wall of the envelope 44. Extreme accuracy of window flatness or orientation is not a prime requirement; however, maintaining parallelism between the two faces is of importance in preventing distortion.

FIGURE 5 illustrates an alternate method of mirror surface support 151. In this instance, an electrostatic deflection tube is shown as an alternate for the magnetic deflection type of FIGURE 4. Mirror surface 146 may be circular, elliptical, or any other convenient shape with front reflecting coating 147 of the type described above. Mirror surface 146 may be held in fixed position by three or four metallic clips 149 which may in turn be spot-welded to mirror support member 151. Mirror support member 151, which may be of suitable spring metal and may be positioned by spring contact against envelope 144, and may be supported by electron gun structure 153 which in turn would support the horizontal deflecting plates 154 (only one of two visible in this view) by the support wires 156 and vertical deflecting plates 158 by support wires 160. The window 152 may be fused into the tube envelope 144 as previously described.

FIGURE 6 shows an additional configuration arrangement for permitting simultaneous viewing and photographic recording. The cathode ray tube 162 may contain the usual form of electron gun structure, electrostatic deflection and beam control elements (not shown), which are well known to those skilled in the art. The tube may also employ an external magnetic field coil structure (not shown) providing magnetic flux normal to the plane of the drawing, so configured to produce bending of the electron beam through an arc equal to the angular offset of the electron gun structure. Tube envelope 162 is adapted with a fused-in transparent window 164 on the fluorescent screen axis 166 so that the camera 168 with the associated lens 170 may photograph the rear or internal surface 172 of the fluorescent screen directly, without reflecting or deflecting optical elements. Simultaneously, an observer at numeral 174 may view the tube face 176 directly. This arrangement permits direct on-axis viewing of the fluorescent screen 172 from either direction, thereby eliminating corrections for off-axis viewing where this may be critical. The type of cathode ray tube 162 indicated in FIGURE 6 is not to be limited to the viewing and photographic positions as shown, since as an alternate, the camera 168 may readily photograph the tube face 176, while with suitable optical elements, the observer 174 may view the rearward portion of the tube screen 172 through the window 164.

FIGURE 7 indicates another pictorial schematic arrangement for viewing the interior of the cathode ray tube 162 while photographing the exterior tube face 176. To illustrate another alternate interior optical means, a prism 178 (supporting means not shown) is positioned within the tube envelope 144 and deflects light rays 180 emanating into the tube interior from the fluorescent screen 172 through an associated transparent window 152 fused into the envelope of tube 144 for exterior viewing. This may be used as an interchangeable alternate to mirror deflection of FIGURES 1, 4, and 5. The arrangement of FIGURE 7 also indicates that, with suitable optical components, an observer positioned at numeral 182 may view the rear or internal surface of the fluorescent screen 172, while a camera 168 with associated lens 170 may photograph the exterior surface 176 directly. The optical device may consist of a suitable envelope enclosure 184 with suitable lens elements 186 (supporting means not delineated). The lens elements 186 may consist of a variety of configurations well known to those versed in the art and is generally illustrated by a suitable objective lens 188; image forming lenses 186, and a suitable eye lens 190. This arrangement greatly facilitates visual viewing in the presence of relatively high ambient light level from which the cathode ray tube 162 and camera 168 may be shielded by a suitable enclosure (not shown).

An alternative arrangement to that of FIGURE 7 is indicated in FIGURE 8, wherein the observer 192 may be placed very close to exit lens 194 permitting much better shielding from extraneous light reflections; and thereby permitting visual use at very high ambient light levels while also permitting larger magnification and aperture angle of view. Since all details of cathode ray tube 162 may be identical with that already described, its description is not repeated here, and it is likewise apparent that where an enclosure is required for tube and camera, it may be provided. The optical viewing device is shown schematically and pictorially, partially in section, within enclosure 184 consisting of objective lens 186 cooperating with tube window 152, image forming lenses shown generally by numeral 186 and with exit (or eye) lens 190 and 194. The lens pairs may be identical with a real image plane occurring between them when provided with suitable optical design.

It is intended that the above described arrangements be considered as merely illustrative of the principles of the invention, and not as restrictive or limiting thereto, since numerous other embodiments and arrangements may readily be devised by those skilled in the art which may fall within the spirit and scope thereof.

I claim as my invention:

1. An oscillographic camera system for signals received by an external signal pickup device comprising an indicator including a two-ended sealed envelope, an electron-emitting structure at one end of said envelope producing a signal-controlled electron beam directed toward the other end of said envelope, an image viewing screen at said other end of said envelope for converting said electron beam energy into radiant energy, means for deflecting said electron beam as a function of said signal pickup device, a window in said envelope, a radiant energy-deflecting surface in said envelope which deflects radiant energy from said image viewing screen through said window, a radiant energy recording device at said window actuatable at periodic intervals, means for translating the signals received by said signal pickup device into a video signal to control said electron beam, said image viewing screen providing a visual display of said video signal, a circuit energized as a function of said signal pickup device; means for adjusting the time of energization of said circuit and a stepping selector switch controlled by said circuit and arranged to actuate said radiant energy recording device in at least one of its positions to record the video displayed on said image viewing screen.

2. An oscillographic camera system for signals received by a signal pickup device comprising a sealed envelope, an electron emitting structure at one end of said envelope producing a signal-controlled electron beam directed toward the other end of said envelope, an image viewing screen at said other end of said envelope for converting said electron beam energy into radiant energy, means for deflecting said electron beam as a function of time, a window in said envelope, a radiant energy-deflecting surface in said envelope which deflects radiant energy from said image viewing screen through said window, a radiant energy recording device at said window actuatable at periodic intervals, amplification and detection means for the signals received by said signal pickup device providing a video signal to control said electron beam, said image viewing screen providing a visual display of said video signal, a circuit energized periodically as a function of time; a stepping selector switch energized by said circuit and arranged to actuate said radiant energy recording device in at least one of its positions to record the video signal displayed on said image viewing screen.

References Cited in the file of this patent

UNITED STATES PATENTS

| | | |
|---|---|---|
| 2,128,632 | Eaton | Aug. 30, 1938 |
| 2,440,736 | Cawein | May 4, 1948 |
| 2,586,772 | Ashby et al. | Feb. 26, 1952 |
| 2,677,722 | Bedford | May 4, 1954 |
| 2,688,897 | Palm | Sept. 14, 1954 |
| 2,716,154 | Raibourn | Aug. 23, 1955 |

FOREIGN PATENTS

| | | |
|---|---|---|
| 921,452 | France | May 8, 1947 |
| 657,047 | Great Britain | Sept. 12, 1951 |

OTHER REFERENCES

"Optical Images Superposed on Radar Oscilloscope," "Electronics" magazine, March 1955, pp. 214, 216.